United States Patent

In-Albon

[11] Patent Number: 5,957,033
[45] Date of Patent: Sep. 28, 1999

[54] COFFEE MACHINE

[75] Inventor: Jean-Paul In-Albon, Ardon, Switzerland

[73] Assignee: Thermoplan AG, Weggis, Switzerland

[21] Appl. No.: 08/829,796

[22] Filed: Aug. 30, 1996

[51] Int. Cl.[6] .............................. A47J 31/44; A47J 31/40
[52] U.S. Cl. ............................ 99/284; 99/290; 99/289 R
[58] Field of Search .............................. 99/284, 286, 287, 99/290, 289 R, 302 P, 302 R, 293

[56] References Cited

U.S. PATENT DOCUMENTS

| 4,681,028 | 7/1987 | Schmed et al. ...................... 99/289 R |
| 4,892,031 | 1/1990 | Webster et al. ...................... 99/295 X |
| 5,367,947 | 11/1994 | Lussi et al. ...................... 99/289 R X |

FOREIGN PATENT DOCUMENTS

| 0 158 579 | 10/1985 | European Pat. Off. . |
| 2 312 998 | 12/1976 | France . |
| 70 32 933 | 12/1970 | Germany . |
| 682 798 | 11/1993 | Switzerland . |
| 93/07792 | 4/1993 | WIPO . |

*Primary Examiner*—Reginald L. Alexander
*Attorney, Agent, or Firm*—Wenderoth, Lind & Ponack, L.L.P.

[57] ABSTRACT

A coffee machine includes a housing frame in which are slidably disposed at least one extraction device, one electronic control unit and a hot-water supply as modules implemented independently of one another. Each modules is provided on a rear side thereof with at least one connector component which in the slide-in state is coupled with a corresponding connector component in the housing frame. The connector components in the housing frame are connected with one another via cables or lines. The coffee machine can be assembled in extremely simple manner, and it is possible in the event of a defect to replace a module without involving an expert.

20 Claims, 2 Drawing Sheets

COFFEE MACHINE

BACKGROUND OF THE INVENTION

The invention relates to a coffee machine with a housing frame in which can be installed at least one extraction device for generating coffee, an electronic control unit, a water supply and a drawer for catching coffee grounds.

In a coffee machine of this type according to EP-B1 0 299 399 a so-called slide-in system is installed in a housing such that it is readily replaceable. Such slide-in system comprises a box-shaped frame which can be slid into the housing on rail guides and on which are disposed an extraction device for generating coffee, a drawer for catching coffee grounds, a hot-water preparation system, control elements as well as further components, such as for example a coffee grinder or a portioning device. While this slide-in system permits the sliding-in and removal of all components together into or from the housing, a disadvantage is that connection tubes and electrical connection cables between the components must be connected by relatively expensive assembly operations and in the case of dismantling must be detached laboriously one from the other.

SUMMARY OF THE INVENTION

In contrast, the object of the present invention is to develop a coffee machine of the above described type, but that can be constructed extremely simply, that permits rapid assembly, and that, for example in the case of a defect, permits simple dismantling and rapid identification and replacement of a defective part.

According to the invention such object is achieved by provision that several modules developed independently one from the other are disposed such that they can be slid into a housing frame. Each module includes on a rear side thereof one connector component which in the slid-in state is coupled with a corresponding connector component in the housing frame. The connector components in the housing frame are connected via cables or lines.

With this arrangement, the coffee machine according to the invention provides a constructively simple solution enabling independent production of the individual modules and, due to the modular design, an extremely simply assembly thereof. Furthermore, a user can replace a defective modules without an expert being needed.

BRIEF DESCRIPTION OF THE DRAWINGS

In the following, an embodiment of the invention as well as additional advantages there will be explained in further detail with reference to the drawings, wherein.

DETAILED DESCRIPTION OF THE INVENTION

Figure 1:
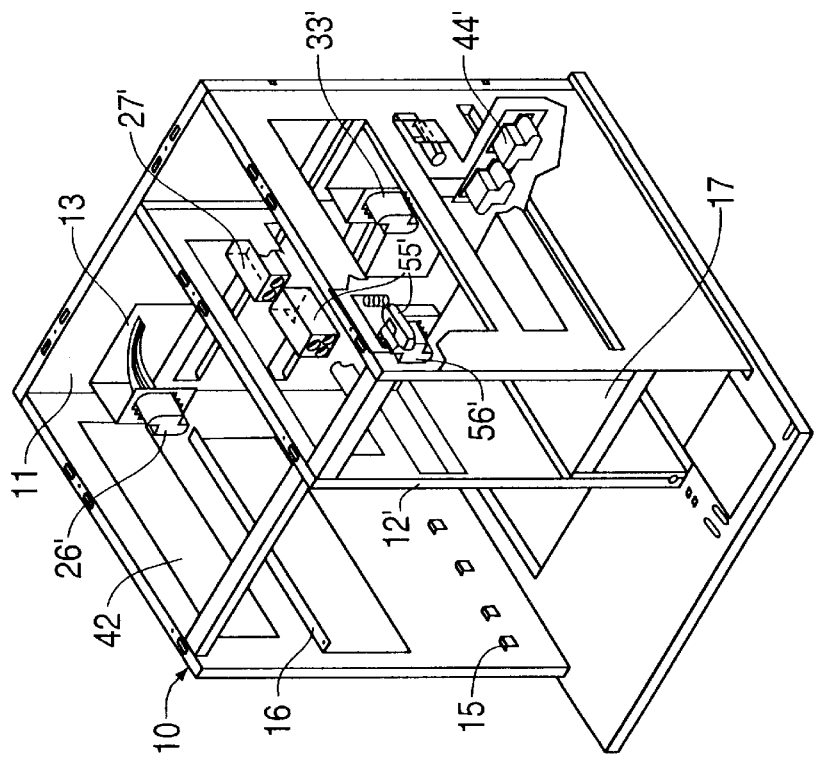
FIG. 1 is a schematic perspective representation of the housing frame of a coffee machine according to the invention.

FIG. 1 depicts a housing frame 10 of a coffee machine, which comprises a support frame 12, a rear wall 11, several connector components described further in the following, as well as a cable channel 13 connecting them. The support frame 12 is open in the front, is fastened at the rear thereof the rear wall 11, and, includes two outer lateral walls as well as a dividing wall 12' disposed therebetween. One outer wall and the dividing wall 12' are provided with horizontal guide ledges 15, 16. An intermediate bottom or shelf 17 is provided between dividing wall 12' and the other outer wall.

Figure 2:
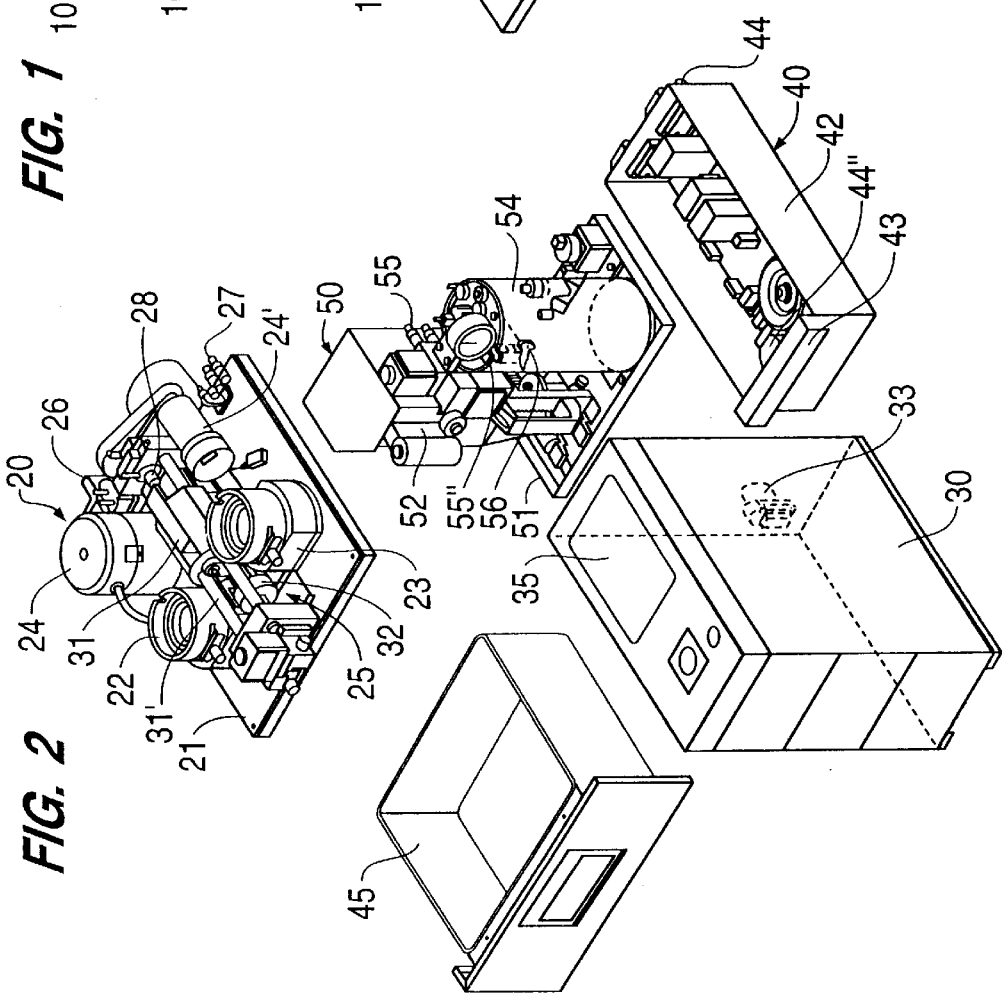
FIG. 2 is a schematic view of discrete modules slidable into the housing frame.

With this implementation of the housing frame 10 as well as also due to its dimensioning, modules, depicted individually in FIG. 2 and implemented according to the invention independently of each other, can be slid in or out.

The principle of an extraction device 20 serving for generating the coffee is explained in detail in EP-B1 0 299 399 and therefore will not be explained in detail in the following. It is fastened on a support plate or sheet 21 and comprises a piston/cylinder unit 25, two grinders 22, 23, a driving member 24 for grinding coffee beans as well as connector components 26, 27 positioned on the rear side of the support sheet 21 respectively establishing an electrical connection and a water connection with an inlet and an outlet of extraction device 20. Further is provided a motor 24' for driving a threaded spindle 28 varying a brewing cylinder 31. The piston/cylinder unit 25 includes brewing cylinder 31 that is open at the front and guided on guide rods 31' so as to be longitudinally displaceable and two piston 32. One piston 32 is disposed stationarily at the open front face of the brewing cylinder while the other is movable via a defined stroke. The brewing cylinder 31 has two laterally opposed openings which correspond with respective particular grinders.

When generating coffee the brewing cylinder 31 is brought by the driving element 24 into a position in which it forms a hollow space bounded by the pistons into which, via one lateral opening, ground coffee is filled in a defined portion. By pulling along the movable piston the cylinder subsequently moves toward the stationary piston. This decreases the hollow space up to a predetermined degree and the coffee portion disposed therein is compressed. In this position, boiling water is pumped through the one piston into the hollow space and, consequently, through the portioned coffee, and subsequently the coffee generated therewith is transported through the other piston to an outlet of the coffee machine. Thereupon the brewing cylinder 31 and, after a specific displacement, also the movable piston are shifted back and specifically until the latter reaches the open cylinder end and the stationary piston 32 has been moved out of the cylinder. Thereby the consumed portion of coffee grounds is ejected and emptied into a collection container 45 disposed underneath cylinder 31. The cylinder 31 is subsequently moved back into the starting position.

An electronic control unit 40 with electronic elements 44'', which are not explained in detail and forming a module, is placed in a drawer 42 with a handle 43 disposed at the front. On the rear wall connector components 44 are provided. Control unit 40 is connected via a power switch with a power connection which is not shown in detail. With unit 40 the entire coffee machine is controlled, which will be described further in the following.

Figure 4:
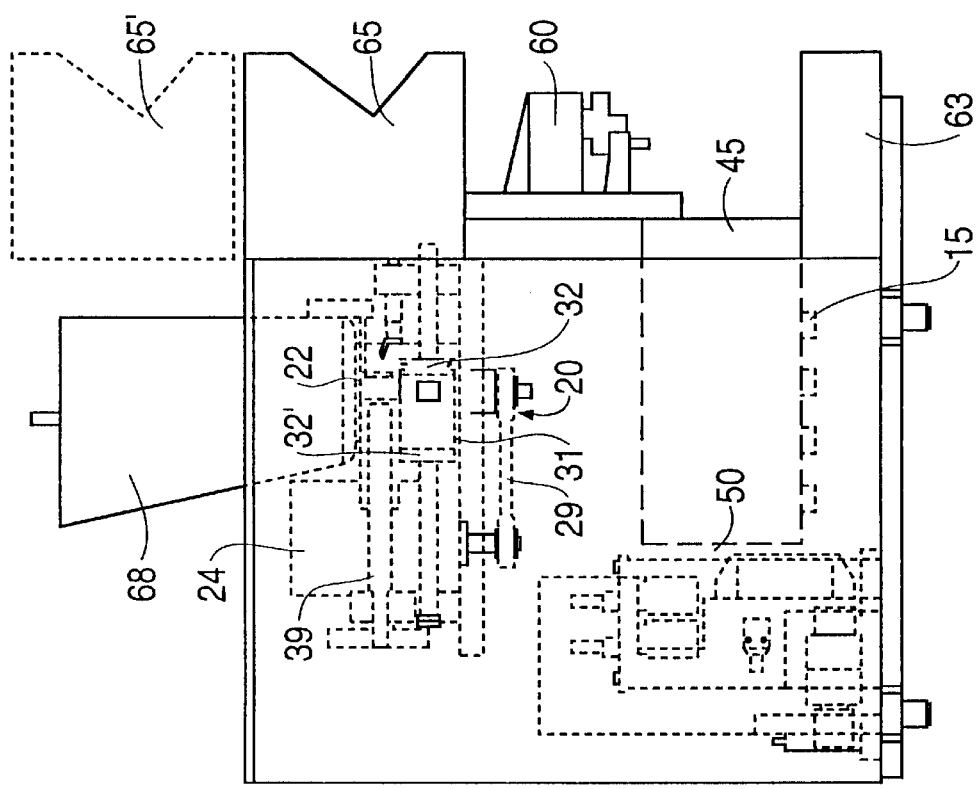
FIG. 4 is a side view of the coffee machine according to the invention.
Figure 3:
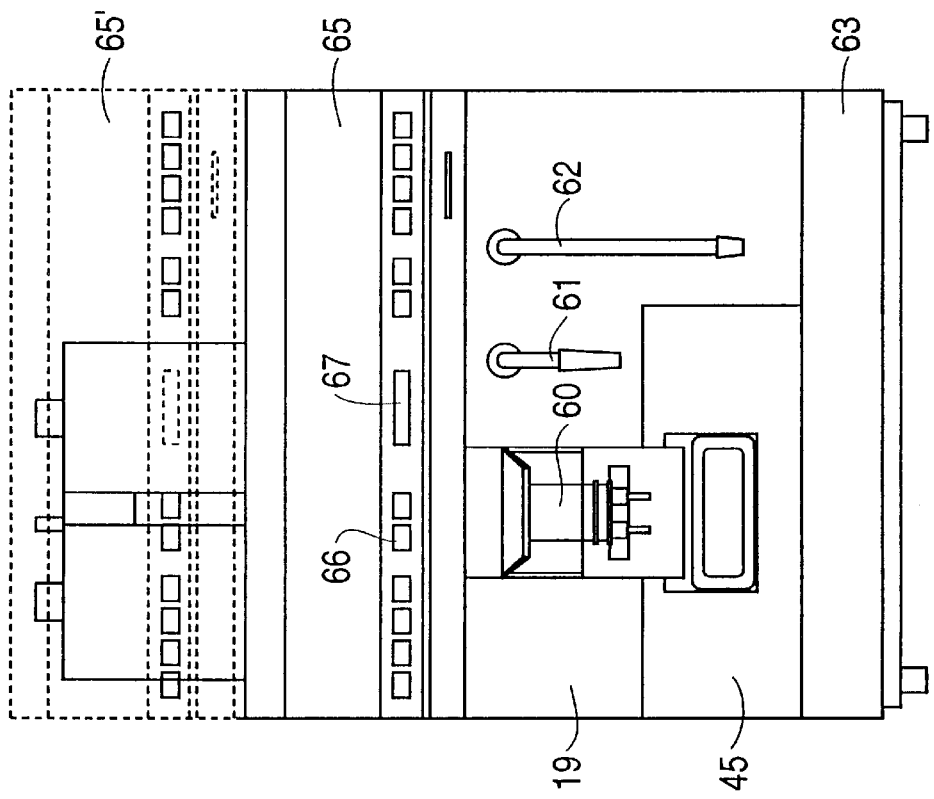
FIG. 3 is a view of the front of the coffee machine according to the invention.

A hot-water and steam supply 50 is also disposed on a support sheet 51 as an additional independent module. It comprises a water pump 52 as well as a heatable water container 54 (boiler). Furthermore, an electric connector component 56 and a connector component 55 with inputs and outputs for a water connection on the rear side of the support sheet 51 are provided. The connector component 55 as well as also the connector component 27 of the device 20 each include a valve, not shown, which causes the closing of through-openings provided in connector components 55, 27 when not plugged. This ensures that when this module is pulled out of the water potentially contained in container 54 does not flow out. The water pump 52 draws water from a line connected to the coffee machine and pumps it into the boiler and, after it is heated, either to the extraction device 20 or directly to an outlet on the coffee machine, by means of which hot water can be removed for tea or the like. For this purpose an additional connector component 55" is provided on the front side of the water supply 50, which is coupled to an outlet cock 61 via a tube (FIGS. 3 and 4). Hot-water supply 50 is connected with a further outlet 52 for discharge of steam.

As a further independent module, a unit 30 is provided in the coffee machine according to the invention for generating milk foam and has a connector component 33 on a rear side thereof. Otherwise, unit 30 is depicted only schematically, because the design and the functional operation thereof are known from EP-A1 0 600 826. Milk is filled into a container 35 provided with a cover milk is heated therein and suctioned via a suction line together with air from a separate air supply by a pump, is pressed through a resistance element and emptied in the thereby generated foamed state into an outlet chamber and subsequently into a coffee cup or the like. Unit 30 is therefore advisably connected with an outlet 60 on the front of the coffee machine by means of a tube, not shown in further detail. The modules explained above are slid independently of each other at respective positions into the housing frame 12. The extraction device 20 is pushed back on the guide ledges 16 until its two connector components 26, 27 are plugged into corresponding connector components 26', 27' on the rear wall 11. The module of the hot-water supply 50 is coupled below device 20 with connector components 55', 56' at a position below module 20. Adjacent module 20, control unit 40 is connector with connector component 44'. Above unit 40, unit 30 is connected with connector component 33'. In front of the hot-water supply 50 is slid a collecting container 45 which is placed underneath the piston/cylinder unit 25, in order to be able to collect the coffee ground portions ejected by the latter. In addition, preferably a (not shown) microswitch is installed in the housing frame 10 and is switched on by the container 45 in a slid-in state so that coffee is brewed only when container 45 is in this position. The connector components on the rear wall 11 of the housing frame 10 are connected to cables or tubes which are guided in the cable channel 13. The way in which the modules are interconnected by cables is not explained in further detail. In any event, the corresponding control commands are transmitted by the control unit 40 to the other modules.

With respect to the plane extending perpendicularly to the direction of plugging in, two connector components 26' and 56' are supported flatingly in the housing frame. They therefore do not need to be positioned precisely with respect to connector components 27', 55'. This ensures when plugging in the device 20 or the hot-water supply 50 that the particular two connector components 26, 27 or 56, 55 of such modules, which moreover are implemented conically at the front, can be centered and plugged in readily into the associated connector components.

A further advantage with this embodiment according to the coffee machine of the invention is that the individual modules and in particular the electronic control unit 40 can be tested before assembly independently of each other, which allows early detection of potential defects and therefore hardly any functional disturbances occur in the completely assembled coffee machine.

Moreover, within the scope of the invention the discrete modules are supported on support sheets 21, 51, drawers 42 or the like, each of which forms a bearing surface such that the components disposed thereon, such as for example the brewing cylinder 31, the grinders 22 and the motor 24 of the extraction device, can be attached essentially one next to the other forming a clearly laid-out configuration. Consequently, in the event of a potential defect of the machine, the modules can be removed independently of one another simply and rapidly, and individual parts of the modules, such as for example a motor, can also be replaced without difficulty because of the clearly laid-out configuration of the modules.

FIGS. 3 and 4 show the assembled coffee machine in front view and in side view, respectively. After the modules are installed in the housing frame, the latter is closed with a chassis and at the front with a housing cover 19 and a height-adjustable control panel 65. Thereby, the individual modules are secured against displacement. The control panel 65 disposed on the upper front side includes various pushbuttons 66 by means of which the machine can be operated as desired in conventional manner. The pushbuttons 66 are connected with the control unit 40 via a not-shown harness of cables and convey to it depending on the button depression a corresponding control command. Further, a display 67 is disposed on panel 65 and always displays to the user the current function, for example "coffee ready". Through the height-adjustable outlet head 60 the coffee made by the extraction device 20 can be discharged into a cup placed therebeneath and, with a corresponding selection, the milk foam generated by unit 30, also can be discharged. In addition, outlet cocks 61 and 62 are provided for removing hot water or water steam. Further, underneath these cocks is disposed a pedestal 63, preferably with a removable collection basin, for drain of potential residual coffee or water.

The control panel 65 extending over the entire length of the housing frame can be shifted upwardly within the scope of the invention via guide rods, not shown, and guided longitudinally in the housing frame, to a position 65' indicated in dot-dash lines so that the modules, specifically the extraction device 20 as well as unit 30, can be slid in or removed from the front. Panel 65 advantageously can be arrested in the depicted operating or assembly positions 65' via means not shown.

FIG. 4 shows the slid-in modules in thinner dot-dash lines. In the upper half of the coffee machine is disposed the extraction device 20. Above the grinder 22 is placed a supply of beaker 68 into which coffee beans can be filled. The grinder 22 is driven via a toothed belt 29 or the like by motor 24. Furthermore, shown are pistons 32 and 32' which close the cylinder 31 in the position shown.

It is understood that the invention can be embodied in other variants. It is for example possible to integrate only two or three modules or even more modules than shown into a coffee machine.

I claim:

1. A coffee machine comprising:
    a housing frame having an open front and a rear, said housing frame having therein a plurality of frame connector components;
    a plurality of units mounted in said housing frame and including at least one extraction device for generating coffee, a water supply for supplying water for preparation of coffee, and an electronic control unit for controlling operation of said extraction device and said water supply;

at least two of said plurality of units comprising independent and separate modules configured to be slidable independently of each other into said housing frame from said open front thereof toward said rear thereof to respective inserted positions; and each said module having at a rear thereof at least one module connector component operable to couple with a respective said frame connector component when said each module is slid to said inserted position thereof.

2. A coffee machine as claimed in claim 1, wherein each of said plurality of units comprises a respective said independent and separate module.

3. A coffee machine as claimed in claim 2, further comprising a milk foam generating unit constructed as an independent and separate module configured to be independently slidable into said housing frame from said open front thereof toward said rear thereof to an inserted position.

4. A coffee machine as claimed in claim 3, further comprising an outlet head disposed at said front of said housing frame for dispensing coffee from said extraction device.

5. A coffee machine as claimed in claim 4, wherein said outlet head is operable to also selectively dispense milk foam from said milk foam generating unit.

6. A coffee machine as claimed in claim 1, further comprising a milk foam generating unit constructed as an independent and separate module configured to be independently slidable into said housing frame from said open front thereof toward said rear thereof to an inserted position.

7. A coffee machine as claimed in claim 6, further comprising an outlet head disposed at said front of said housing frame for dispensing coffee from said extraction device.

8. A coffee machine as claimed in claim 7, wherein said outlet head is operable to also selectively dispense milk foam from said milk foam generating unit.

9. A coffee machine as claimed in claim 1, further comprising an outlet head disposed at said front of said housing frame for dispensing coffee from said extraction device.

10. A coffee machine as claimed in claim 1, wherein said housing frame has at said rear thereof a rear wall, and at least some of said frame connector components are mounted on said rear wall.

11. A coffee machine as claimed in claim 1, wherein at least some of said frame connector components have forwardly facing conical configurations to facilitate centering and coupling with respective said module connector components.

12. A coffee machine as claimed in claim 1, wherein at least some of said frame connector components are mounted for movement in a plane extending in a direction perpendicular to a direction of insertion of said modules into said housing frame.

13. A coffee machine as claimed in claim 1, further comprising a control panel mounted on said housing frame for movement relative thereto between an operating position, whereat said control panel is arrested at said front of said housing frame, and an open position, whereat said control panel is raised from said front of said housing frame and said module may be slid independently of each other into and out of said housing frame.

14. A coffee machine as claimed in claim 1, wherein said housing frame has therein guide elements for guiding sliding movement of said modules into and out of said housing frame.

15. A coffee machine as claimed in claim 14, wherein said guide elements include at least one horizontal shelf.

16. A coffee machine as claimed in claim 14, wherein said guide elements include guide ledges.

17. A coffee machine as claimed in claim 1, further comprising a drawer for collecting coffee grounds from prepared coffee, said drawer being configured to be slidable independently of said modules into said housing frame from said open front thereof toward said rear thereof to an inserted position.

18. A coffee machine as claimed in claim 1, further comprising a collecting container configured to be slidable independently of said modules into said housing frame from said open front thereof toward said rear thereof to an inserted position beneath said extraction device.

19. A coffee machine as claimed in claim 1, wherein each said module comprises a support sheet forming a bearing surface for operating components of said each module, said support sheet being slidable into and out of said housing frame.

20. A coffee machine as claimed in claim 1, further comprising a removable cover for covering said open front of said housing frame.

* * * * *